United States Patent
Nakamura

(10) Patent No.: US 11,936,336 B2
(45) Date of Patent: Mar. 19, 2024

(54) SOLAR ENERGY UTILIZATION DEVICE

(71) Applicant: Yazaki Energy System Corporation, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 52 days.

(21) Appl. No.: 16/911,564

(22) Filed: Jun. 25, 2020

(65) Prior Publication Data

US 2020/0328717 A1 Oct. 15, 2020

Related U.S. Application Data

(63) Continuation of application No. PCT/JP2018/045322, filed on Dec. 10, 2018.

(30) Foreign Application Priority Data

Dec. 26, 2017 (JP) ................ 2017-248816

(51) Int. Cl.
| | |
|---|---|
| H02S 40/22 | (2014.01) |
| E06B 5/00 | (2006.01) |
| F24S 20/63 | (2018.01) |
| F24S 23/70 | (2018.01) |
| G02B 5/04 | (2006.01) |
| H02S 40/44 | (2014.01) |

(52) U.S. Cl.
CPC ............... *H02S 40/22* (2014.12); *E06B 5/00* (2013.01); *F24S 20/63* (2018.05); *F24S 23/70* (2018.05); *G02B 5/045* (2013.01); *H02S 40/44* (2014.12)

(58) Field of Classification Search
CPC . H01L 31/054; H01L 31/0547; H01L 31/052; H02S 40/20; H02S 40/22; F24S 23/10; F24S 23/12
See application file for complete search history.

(56) References Cited

U.S. PATENT DOCUMENTS

| | | | |
|---|---|---|---|
| 4,344,417 A | 8/1982 | Malecek | |
| 5,594,591 A | 1/1997 | Yamamoto et al. | |
| 2007/0227581 A1* | 10/2007 | Chen ................. | G02B 19/0014 |
| | | | 136/246 |
| 2008/0128016 A1 | 6/2008 | Lichy | |
| 2009/0101207 A1* | 4/2009 | Milbourne ......... | H01L 31/0547 |
| | | | 136/259 |
| 2010/0133422 A1 | 6/2010 | Lin et al. | |

(Continued)

FOREIGN PATENT DOCUMENTS

| | | |
|---|---|---|
| JP | 59-48505 U | 3/1984 |
| JP | 6-275859 A | 9/1994 |

(Continued)

OTHER PUBLICATIONS

Refractive index for PMMA retrieved from https://refractiveindex.info/?shelf=organic&book=poly(methyl_methacrylate)&page=Szczurowski on May 12, 2021.*

(Continued)

*Primary Examiner* — Christina Chern
(74) *Attorney, Agent, or Firm* — Sughrue Mion, PLLC

(57) ABSTRACT

A solar energy utilization window includes two plate members, and a first prism, and an energy collection portion, in which the energy collection portion is installed with a predetermined gap interposed between the energy collection portion and a second side of a first prism, and in a triangular prism, a refractive index and each internal angle of the triangle are set so that there are three types of optical paths of sunlight that has passed through an outer glass and entered into a first prism from the first side.

7 Claims, 9 Drawing Sheets

(56) References Cited

U.S. PATENT DOCUMENTS

| | | | |
|---|---|---|---|
| 2011/0265855 A1* | 11/2011 | Baruchi | H01L 31/0547 |
| | | | 136/246 |
| 2012/0090681 A1* | 4/2012 | Chang | H01L 31/052 |
| | | | 257/E31.113 |
| 2012/0154921 A1 | 6/2012 | Yoshida et al. | |
| 2012/0222722 A1 | 9/2012 | Baruchi et al. | |
| 2014/0160383 A1 | 6/2014 | Shikii et al. | |

FOREIGN PATENT DOCUMENTS

| | | |
|---|---|---|
| JP | 8-211207 A | 8/1996 |
| JP | 2009-26641 A | 2/2009 |
| JP | 2012-3024 A | 1/2012 |
| JP | 2013-508582 A | 3/2013 |
| WO | 2009/121180 A1 | 10/2009 |
| WO | 2013/183288 A1 | 12/2013 |

OTHER PUBLICATIONS

Definition of "point symmetry" retrieved from https://www.mathsisfun.com/definitions/point-symmetry.html on Oct. 6, 2021.*

Refractive index of CCI4 from https://refractiveindex.info/?shelf=organic&book=carbon_tetrachloride&page=Kedenburg on Jun. 28, 2022.*

Reflection Symmetry from math-only-math.com retrieved from https://www.math-only-math.com/reflection-symmetry.html on Oct. 6, 2022.*

\* cited by examiner

FIG. 3

APEX ANGLE 25°

| MATERIAL | REFRACTIVE INDEX | FIRST BASE ANGLE | | | | | | | |
|---|---|---|---|---|---|---|---|---|---|
| | | 105° | 100° | 95° | 90° | 85° | 80° | 75° | |
| POROUS MATERIAL OR THE LIKE | 1.17 | 41 | 41 | 41 | 41 | 41 | 41 | 41 | |
| POROUS MATERIAL OR THE LIKE | 1.25 | 37 | 37 | 37 | 37 | 37 | 37 | 37 | |
| POROUS MATERIAL OR THE LIKE | 1.30 | 41 | 34 | 34 | 34 | 34 | 34 | 41 | |
| WATER/FLUORORUBBER | 1.33 | 44 | 37 | 33 | 33 | 33 | 37 | 44 | |
| 20% SALINE/FLUORORESIN | 1.37 | 49 | 41 | 33 | 31 | 33 | 41 | 49 | |
| SILICONE/ACRYLIC | 1.41 | 54 | 45 | 37 | 30 | 37 | 45 | 54 | |
| BOROSILICATE GLASS | 1.48 | 65 | 53 | 44 | 35 | 44 | 53 | 65 | |
| SODA-LIME GLASS | 1.52 | 73 | 58 | 48 | 38 | 48 | 58 | 73 | |
| POLYCARBONATE | 1.59 | NG | 70 | 56 | 45 | 56 | 70 | NG | |

FIG. 4

APEX ANGLE 30°

| MATERIAL | REFRACTIVE INDEX | 105° | 100° | 95° | 90° | 85° | 80° | 75° |
|---|---|---|---|---|---|---|---|---|
| POROUS MATERIAL OR THE LIKE | 1.17 | 35 | 35 | 35 | 35 | 35 | 35 | 35 |
| POROUS MATERIAL OR THE LIKE | 1.25 | 30 | 30 | 30 | 30 | 30 | 30 | 30 |
| POROUS MATERIAL OR THE LIKE | 1.30 | 33 | 27 | 27 | 27 | 27 | 27 | 33 |
| WATER/FLUORORUBBER | 1.33 | 37 | 29 | 26 | 26 | 26 | 29 | 37 |
| 20% SALINE/FLUORORESIN | 1.37 | 41 | 33 | 26 | 24 | 26 | 33 | 41 |
| SILICONE/ACRYLIC | 1.41 | 45 | 37 | 29 | 22 | 29 | 37 | 45 |
| BOROSILICATE GLASS | 1.48 | 53 | 44 | 35 | 27 | 35 | 44 | 53 |
| SODA-LIME GLASS | 1.52 | 58 | 48 | 38 | 30 | 38 | 48 | 58 |
| POLYCARBONATE | 1.59 | 70 | 56 | 45 | 35 | 45 | 56 | 70 |

FIRST BASE ANGLE

FIG. 5

APEX ANGLE 35°

| MATERIAL | REFRACTIVE INDEX | FIRST BASE ANGLE | | | | | | |
|---|---|---|---|---|---|---|---|---|
| | | 105° | 100° | 95° | 90° | 85° | 80° | 75° |
| POROUS MATERIAL OR THE LIKE | 1.17 | 29 | 29 | 29 | 29 | 29 | 29 | 29 |
| POROUS MATERIAL OR THE LIKE | 1.25 | 23 | 23 | 23 | 23 | 23 | 23 | 23 |
| POROUS MATERIAL OR THE LIKE | 1.30 | 27 | 21 | 21 | 21 | 21 | 21 | 27 |
| WATER/FLUORORUBBER | 1.33 | 29 | 22 | 19 | 19 | 19 | 22 | 29 |
| 20% SALINE/FLUORORESIN | 1.37 | 33 | 26 | 19 | 17 | 19 | 26 | 33 |
| SILICONE/ACRYLIC | 1.41 | 37 | 29 | 22 | 14 | 22 | 29 | 37 |
| BOROSILICATE GLASS | 1.48 | 44 | 35 | 27 | 19 | 27 | 35 | 44 |
| SODA-LIME GLASS | 1.52 | 48 | 38 | 30 | 22 | 30 | 38 | 48 |
| POLYCARBONATE | 1.59 | 56 | 45 | 35 | 27 | 35 | 45 | 56 |

FIG. 6

| APEX ANGLE | 15° | 20° | 25° | 30° | 35° | 40° | 45° |
|---|---|---|---|---|---|---|---|
| LOWER LIMIT ELEVATION ANGLE | 46° | 37° | 30° | 22° | 14° | 8° | 1° |

FIG. 7

| | | ENCLOSED LIQUID | | | | | |
|---|---|---|---|---|---|---|---|
| | REFRACTIVE INDEX | 1.33 | 1.37 | 1.41 | 1.48 | 1.52 | 1.59 |
| PRISM WALL | 1.33 | 26 | 24 | 22 | 27 | 30 | 35 |
| | 1.37 | 26 | 24 | 22 | 27 | 30 | 35 |
| | 1.41 | 26 | 24 | 22 | 27 | 30 | 35 |
| | 1.48 | 26 | 24 | 22 | 27 | 30 | 35 |
| | 1.52 | 26 | 24 | 22 | 27 | 30 | 35 |
| | 1.59 | 26 | 24 | 22 | 27 | 30 | 35 |

SOLAR ENERGY UTILIZATION DEVICE

CROSS REFERENCE TO RELATED APPLICATIONS

This application is a continuation of PCT application No. PCT/JP2018/045332, which was filed on Dec. 10, 2018 based on Japanese patent application 2017-248816 filed on Dec. 26, 2017, whose contents are incorporated herein by reference. Also, all the references cited herein are incorporated as a whole.

BACKGROUND OF THE INVENTION

1. Technical Field

The present invention relates to a solar energy utilization device.

2. Background Art

In the related art, there has been proposed a solar energy utilization window equipped with a photovoltaic panel that generates power by using sunlight, which is one of solar energy (see Patent Document 1). In this solar energy utilization window, a photovoltaic panel and a triangular prism having a triangular cross-section are provided between two transparent plate members. In a case where the solar energy utilization window is viewed in cross-section, in the triangular prism, the first side of the triangle extends along the two transparent plate members, and the second and the third sides extend in a direction intersecting the two transparent plate members.

Here, in the solar energy utilization window described in Patent Document 1, the angles of the second and third sides with respect to the first side are determined from the relationship with the light-receiving angle of sunlight, and the photovoltaic panel is installed in contact with the second side. The third side is the side closer to the sun than the second side (in a case where the window is used in an upright state, the third side is the side above the second side).

In such a solar energy utilization window, it is possible to appropriately reflect sunlight by the triangular prism and collect a large amount of light on the photovoltaic panel. Furthermore, in such a solar energy utilization window, scattered light when sunlight is reflected on the ground or the like can be passed by setting the angle of the triangular prism. Therefore, it is possible to provide a solar energy utilization window through which the scenery can be viewed from the indoor side without blocking the passage of scattered light while appropriately collecting the sunlight in the photovoltaic panel.

CITATION LIST

Patent Literature

[Patent Document 1] JP-T-2013-508582

SUMMARY

Here, the solar energy utilization window is not limited to the photovoltaic panel, and a heat collector (heat collection tube and heat collection duct) that utilizes solar heat to heat a heating medium or air, or a heat transfer means (heat pipe and the like) that transfers the taken-in solar heat may be provided. Furthermore, it is possible to provide a plurality of types of solar energy collection portions (energy collection portions) for collecting such solar energy.

However, in the solar energy utilization window described in Patent Document 1, since an energy collection portion is installed in contact with the second side, even if the sunlight is collected in the energy collection portion, the solar heat is transferred to the triangular prism, and there is room for improvement from the viewpoint of efficiently utilizing the solar energy.

The problem of room for improvement above is not limited to the solar energy utilization window provided with two transparent plate members and used as d window, and this problem is also common to solar energy utilization devices in which the light-receiving side of sunlight is a transparent plate member and the opposite side is a non-transparent plate member.

The present invention has been made to solve such a problem, and an object of the present invention is to provide a solar energy utilization device that can utilize solar energy more efficiently.

Solution to Problem

A solar energy utilization device according to the present invention includes two plate members, a triangular prism, and an energy collection portion. The two plate members are transparent on an incident side of sunlight. The energy collection portion is installed with a predetermined gap interposed between the energy collection portion and the second side, which is the lower side of the second and third sides, and collects solar energy. In the triangular prism, a refractive index and each internal angle of a triangle are set so that there are three types of optical paths. One of the three types of optical paths is a path along which the sunlight enters into the triangular prism from the first side, directly reaches the second side, and goes out of the triangular prism from the second side. The other is a path along which the sunlight enters into the triangular prism from the first side and is fully reflected at the third side, and then reaches the second side and goes out of the triangular prism from the second side. The remaining one is a path along which the sunlight enters into the triangular prism from the first side and is fully reflected at the third side and the first side in this order, and then reaches the second side and goes out of the triangular prism from the second side.

According to the present invention, the energy collection portion is installed with a predetermined gap interposed between the energy collection portion and the second side. Therefore, the presence of the predetermined gap makes it difficult for the solar heat in the energy collection portion to transfer to the triangular prism. Further, in the triangular prism, since the refractive index and each internal angle of the triangle are set so that there are the three types of optical paths, the sunlight that has entered into the triangular prism from the first side goes out of the triangular prism from the second side directly or after undergoing full reflection at the third side and the first side. That is, when the sunlight incident on the first side of the triangular prism is emitted from the second side, the sunlight can be collected also in the energy collection portion disposed with a predetermined gap. Therefore, it is possible to utilize solar energy more efficiently by collecting the sunlight in the energy collection portion while suppressing the heat transfer.

BRIEF DESCRIPTION OF THE DRAWINGS

FIG. 3 is a table illustrating a relationship between an angle of a first base angle and a lower limit elevation angle when a refractive index of the first prism is changed, in a case where an apex angle AA of the first prism is 25°.

FIG. 4 is a table illustrating a relationship between the angle of the first base angle and the lower limit elevation angle when the refractive index of the first prism is changed, in a case where the apex angle AA of the first prism is 30°.

FIG. 5 is a table illustrating a relationship between the angle of the first base angle and the lower limit elevation angle when the refractive index of the first prism is changed, in a case where the apex angle AA of the first prism is 35°, FIG. 6 is a table illustrating a relationship with the lower limit elevation angle when the apex angle is changed, in a case where the refractive index of the first prism is approximately 1.41 and the first base angle is 90°.

FIG. 7 is a table illustrating a relationship between refractive indices of a prism wall and an internal member of the first prism illustrated in FIG. 2, and the lower limit elevation angle.

DETAILED DESCRIPTION OF EMBODIMENTS

Hereinafter, the present invention will be described along with preferred embodiments. The present invention is not limited to the embodiments described below and can be modified as appropriate without departing from the spirit of the present invention. In the following embodiments, some components are not illustrated or described, but as for the details of the omitted technology, it goes without saying that a known or well-known technology is appropriately applied within a range that does not cause inconsistency with the content described below.

Figure 1:
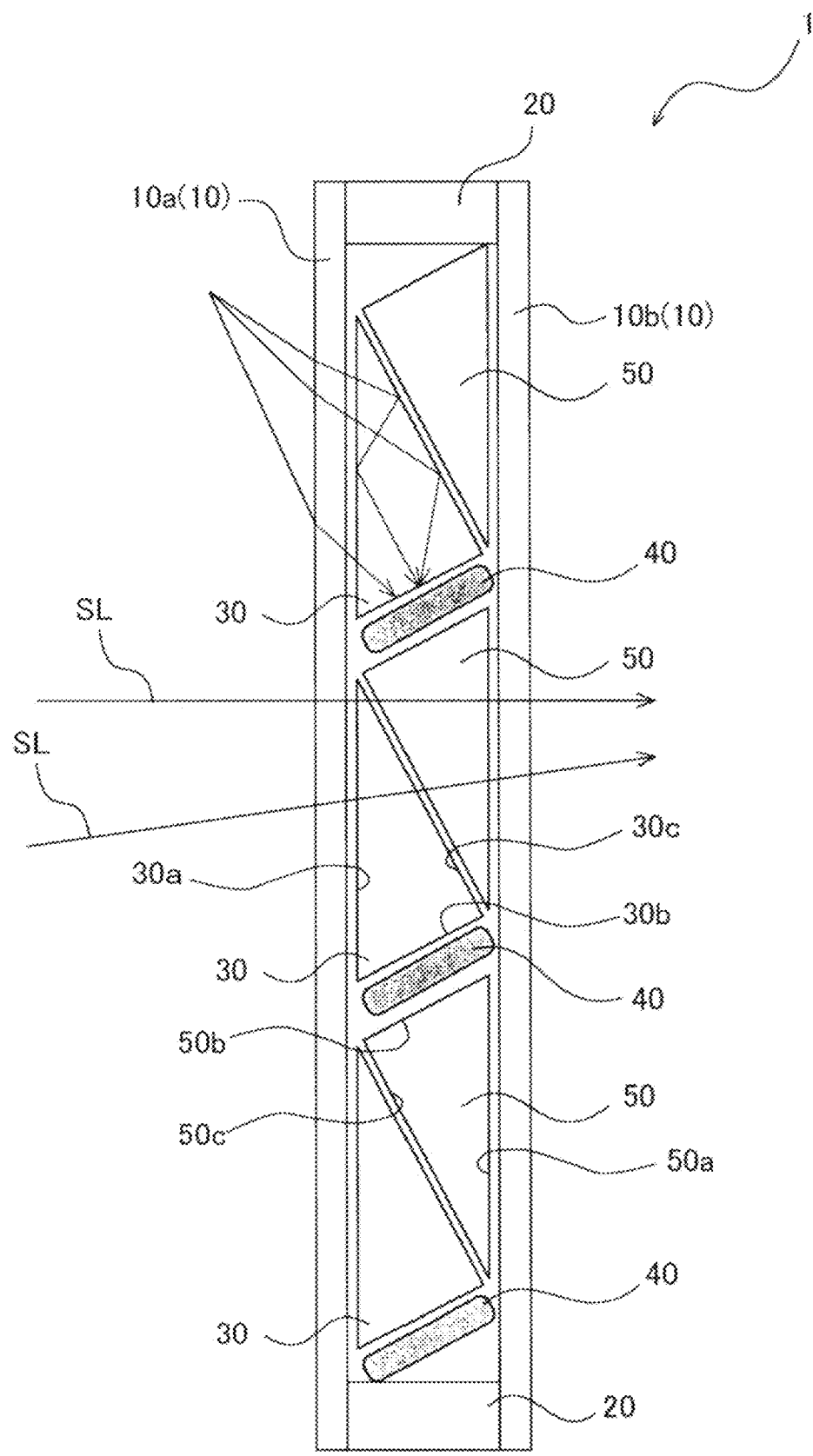
FIG. 1 is a cross-sectional view illustrating a solar energy utilization window according to an embodiment of the present invention.

FIG. 1 is a cross-sectional view illustrating a solar energy utilization window according to an embodiment of the present invention. In FIG. 1, a solar energy utilization window applicable as a window (whether opened or closed) will be described as an example of a solar energy utilization device, but the solar energy utilization device is not limited to ne to be applied to a window, and may be one attached to an outer wall.

A solar energy utilization window 1 according to the example illustrated in FIG. 1 schematically includes two plate members 10, a vacuum sealing member 20, a plurality of first prisms (triangular prisms) 30, a plurality of energy collection portions 40, and a plurality of second prisms 50.

The two plate embers 10 are transparent plate members arranged substantially parallel to each other. These plate members 10 are made of, for example, a glass member, and among the two plate members 10, the one on the outdoor side is an outer glass (transparent plate member) 10a, and the one on the indoor side is an inner glass (plate member) 10b.

The vacuum sealing member 20 is interposed between the two plate members 10 at the peripheral ends of the two plate members 10. By providing the vacuum sealing members 20 at the peripheral ends of the two plate members 10, an internal space closed by the two plate members 10 and the vacuum sealing member 20 is formed. In the present embodiment, the internal space is in a vacuum state from the viewpoint of heat insulation, but not limited thereto, and may be filled with a gas such as air, argon, or krypton.

Each of the plurality of first prisms 30 is formed of a prism having a triangular shape in a cross-sectional view (that is, a prism having a triangular prism shape). These first prisms 30 are arranged facing the outer glass 10a so that a first side 30a is along the outer glass 10a. A second side 30b and a third side 30c of the first prism 30 extend at a predetermined angle with respect to the first side 30a. The second side 30b is a side located vertically below the third side 30c.

Figure 2:
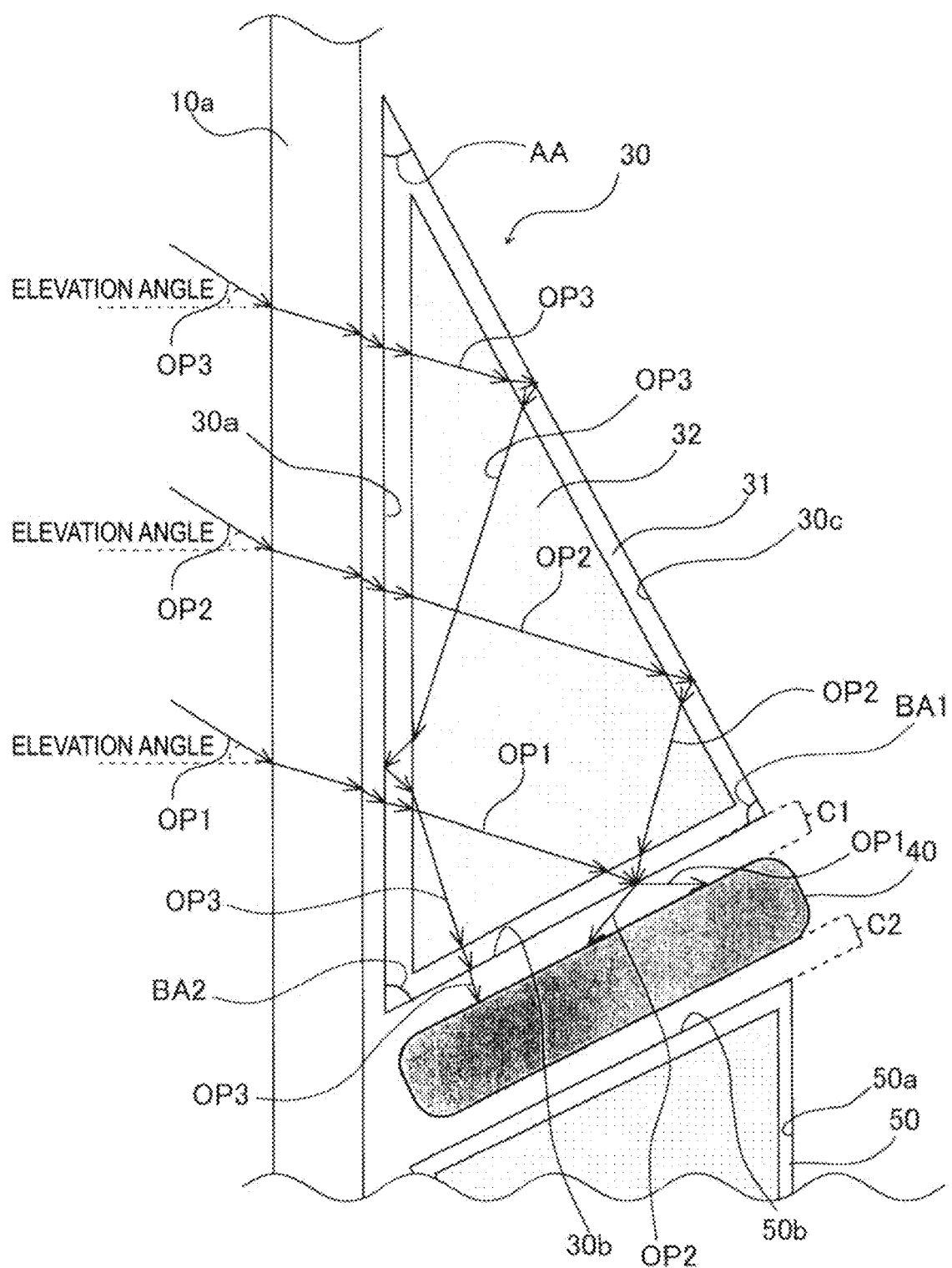
FIG. 2 is an enlarged view of a first prism illustrated in FIG. 2.

FIG. 2 is an enlarged view of the first prism 30 illustrated in FIG. 2. As illustrated in FIG. 2, the first prism 30 includes a prism wall 31 forming an outer wall of the first prism 30 and an internal member 32 made of a transparent liquid enclosed in the prism wall 31. The first prism 30 is not limited to the configuration illustrated in FIG. 2, and may be made of a solid glass material or resin material. In addition, the internal member 32 may be gel or solid.

The plurality of energy collection portions 40 illustrated in FIG. 1 is a device that collects solar energy and utilizes solar energy for power generation, heating of another medium, heat transfer, and the like and corresponds to, for example, a solar cell panel, a heat collector, and a heat transfer means. Each of these energy collection portions 40 is provided so as to face the second side 30b of the first prism 130.

Each of the plurality of second prisms 50 is a prism having a triangular shape in a cross-sectional view (that is, a prism having a triangular prism shape), and has the same shape and the same refractive index as the first prism 30. The second prism 50 has a point-symmetrical orientation obtained by rotating the first prism 30 by 180°, and one second prism 50 is provided for each first prism 30. Here, when only the first prism 30 is provided, the light is refracted by the first prism 30, and the scenery when viewed from the indoor side is distorted (that is, a scattered light SL is significantly distorted). However, since the second prism 50 is provided as a pair with the first prism 30, the distortion of the scenery when viewed from the indoor side is suppressed (an image restoration effect is provided). The second prism 50 may include a prism wall and an internal member similarly to the first prism 30, or may include a solid member.

Specifically, the second prisms 50 are arranged facing the inner glass 10b so that fourth sides 50a of the second prisms 50 are along the inner glass 10b. A fifth side 50b and a sixth side 50c of the second prism 50 extend at a predetermined angle with respect to the fourth side 50a. The fifth side 50b is located vertically above the sixth side 50c. In such a second prism 50, the sixth side 50c faces the third side 30c of the first prism 30 that is adjacent in the horizontal direction, and the fifth side 50b faces the second side 30b of the first prism 30 that is adjacent in the vertical direction with the energy collection portion 40 interposed therebetween.

In addition, in the present embodiment, the two plate members 10, the first prism 30, and the second prism 50 are arranged with a minute gap therebetween. Intervening members such as minute columns and particles are interposed therebetween so that a minute gap is maintained. As a result, the solar energy utilization window 1 has a laminated structure of the outer glass 10a, the intervening member, the first prism 30, the intervening member, the second prism 50, the intervening member, and the inner glass 10b in this order, and even if the internal space is in a vacuum state, the internal space is supported to withstand the pressure.

Further, in the present embodiment, the energy collection portion 40 is provided with a gap C1 with respect to the second side 30b of the first prism 30, as illustrated in FIG. 2. In order to maintain the gap C1, a fine intervening member may be interposed as in the above, or the position may be maintained by another fixing means. In this way, by providing the gap C1 between the energy collection portion 40 and the second side 30b of the first prism 30, a vacuum layer (or a gas layer) is formed therebetween to prevent the heat of the energy collection portion 10 from transferring to the first prism 30.

In addition, the energy collection portion 40 is provided with a gap C2 also with respect to the fifth side 50b of the second prism 50. Therefore, the energy collection portion 40 is provided separately from both the second side 30b of the first prism 30 and the fifth side 50b of the second prism 50. In order to maintain the gap C2, a fine intervening member may be interposed as in the above, or the position may be maintained by another fixing means. In addition, by providing the gap C2 between the energy collection portion 40 and the fifth side 50b of the second prism 50, a vacuum layer (or a gas layer) is formed therebetween to prevent the heat of the energy collection portion 40 from transferring to the second prism 50.

Since the gap C1 is provided between the energy collection portion 40 and the second side 30b of the first prism 30, the first prism 30 is required to not only guide the sunlight that has entered the first prism 30 to the second side 30b, but also emit the sunlight without fully reflecting the sunlight on the second side 30b, and the refractive index and each internal angle of the triangle are set so as to satisfy such a condition.

Specifically, in the first prism 30, a refractive index and each internal angle of the triangle are set so that three types of optical paths OP1 to OP3 are realized. Here, in the first optical path OP1 of the three types of optical paths OP1 to OP3, the sunlight that has passed through the outer glass 10a and entered into the first prism 30 from the first side 30a directly reaches the second side 30b and goes out of the first prism 30 from the second side 30b. In the second optical path OP2, the sunlight is fully reflected at the third side 30c, reaches the second side 30b, and goes out of the first prism 30 from the second side 30b. In the third optical path OP3, the sunlight is fully reflected at the third side 30c and the first side 30a in this order, and then reaches the second side 30b and goes out of the first prism 30 from the second side 30b.

In order to realize such first to third optical paths OP1 to OP3, the incident angle to the second side 30b of the first optical path OP1 needs to be less than a critical angle. In addition, the incident angle to the third side 30c of the second optical path OP2 needs to be greater than or equal to the critical angle, and the incident angle to the second side 30b after the full reflection needs to be less than the critical angle. Furthermore, the incident angle to the third side 30c of the third optical path OP3 needs to be greater than or equal to the critical angle, the incident angle to the first side 30a after the full reflection needs to be greater than or equal to the critical angle, and further, the incident angle to the second side 30b after full reflection needs to be less than the critical angle. In a case where the first prism 30 satisfies the conditions of the second optical path OP2 and the third optical path OP3, the condition for three times or more of full reflection in the first prism 30 is always satisfied.

Here, in the following description, the angle formed by the first side 30a and the third side 30c is called an apex angle AA, the angle formed by the second side 30b and the third side 30c is called a first base angle BA1, and the angle formed by the first side 30a and the second side 30b is called a second base angle BA2.

FIG. 3 is a table illustrating the relationship between the angle of the first base angle BA1 and a lower limit elevation angle (rounded up in 1° increment) when the refractive index of the first prism 30 is changed, in a case where the apex angle AA of the first prism 30 is set to 25°. The lower limit elevation angle refers to the lower limit of the elevation angle at which the first to third optical paths OP1 to OP3 are realized. The elevation angle here means the angle formed by the direction of the line of sight when looking up at the sun and the orthogonal direction orthogonal to the two plate members 10 and is the same as the sun altitude in a case where the solar energy utilization window 1 is used in an upright state. Therefore, in a case where the sunlight enters the first side 30a at an elevation angle equal to or higher than the lower limit elevation angle, the first to third optical paths OP1 to OP3 are realized.

As illustrated in FIG. 3, in a case where the material of the first prism 30 is porous material or the like having a refractive index of 1.17, when the first base angle BA1 is 105°, 100°, 95°, 90°, 85°, 80°, and 75°, the lower limit elevation angle is 41°.

In addition, in a case where the material of the first prism 30 is a porous material or the like having a refractive index of 1.25, when the first base angle BA1 is 105°, 100°, 95°, 90°, 85°, 80°, and 75° the lower limit elevation angle is 37°.

In a case where the material of the first prism 30 is a porous material or the like having a refractive index of 1.30, when the first base angle BA1 is 105° and 75°, the lower limit elevation angle is 41°, and when the first base angle BA1 is 100°, 95°, 90°, 85° and 80°, the lower limit elevation angle is 34°.

In a case where the material of the first prism 30 is fluororubber having a refractive index of 1.33 and enclosed with water, when the first base angle BA1 is 105°, 100°, 95°, 90°, 85°, 80°, and 75° in this order, the lower limit elevation angle is 44°, 37°, 33°, 33°, 33°, 37°, and 44°.

In a case where the material of the first prism 30 is a fluororesin having a refractive index of 1.37 and enclosed with 20% saline, when the first base angle BA1 is 105°, 100°, 95°, 90°, 85°, 80°, and 75° in this order, the lower limit elevation angle is 49°, 41°, 33°, 31°, 33°, 41°, and 49°.

In a case where the material of the first prism 30 is acrylic having a refractive index of 1.41 and enclosed with silicone, when the first base angle BA1 is 105°, 100°, 95°, 90°, 85°, 80°, and 75° in this order, the lower limit elevation angle is 54°, 45°, 37°, 30°, 37°, 45°, and 54°.

In a case where the material of the first prism 30 is a borosilicate glass having a refractive index of 1.48, when the first base angle BA1 is 105°, 100°, 95°, 90°, 85°, 80°, and 75° in this order, the lower limit elevation angle is 65°, 53°, 44°, 35°, 44°, 53°, and 65°.

In a case where the material of the first prism 30 is a soda-lime glass having a refractive index of 1.52, when the first base angle BA1 is 105°, 100°, 95°, 90°, 85°, 80°, and 75° in this order, the lower limit elevation angle is 73°, 58°, 48°, 38°, 48°, 58°, and 73°.

In a case where the material of the first prism 30 is polycarbonate having a refractive index of 1.59, when the first base angle BA1 is 105°, 100°, 95°, 90°, 85°, 80°, and 75° in this order, the lower limit elevation angle is NG (NG means a value of 90° or more, which means that the value does not make sense for a product), 70°, 56°, 45°, 56°, 70°, and NG.

Here, it can be said that the smaller the lower limit elevation angle is, the more preferable from the viewpoint of energy acquisition because the sunlight can be collected in the energy collection portion 40 in a wider angle range. On the other hand, it is desirable for the window that the apex angle AA is small, the vertical intervals between the energy collection portions 40 are wide, and the scattered light and the outside scene that are almost horizontal are transmitted indoors without being fully reflected. Therefore, it is desirable that a minimum lower elevation angle is provided for a certain apex angle AA, and the lower limit elevation angle appropriately covers the altitude range that the sun can take in consideration of time and season in the installation area and direction. In addition, as illustrated in FIG. 3, when the refractive index is approximately 1.41 and the first base angle BA1 is 90°, the lower limit elevation angle becomes the minimum value (30°). Therefore, it can be said that the first prism 30 preferably has a refractive index of approximately 1.41 and the first base angle BA1 of 90°. However, from the problem of the material of the first prism 30, and the like, in the first prism 30, the refractive index does not need to be approximately 1.41 and the first base angle BA1 does not need to be 90°, and the refractive index and the internal angle may be set so that the lower limit elevation angle up to the minimum lower limit elevation angle +10° (40°) is achieved.

That is, in the example illustrated in FIG. 3, when the refractive index is 1.25 and the first base angle BA1 is 75° or more and 105° or less, the refractive index is 1.30 and 1.33 and the first base angle BA1 is 80° or more and 100° or less, the refractive index is 1.37 and 1.41 and the first base angle BA1 is 85° or more and 95° or less, and the refractive index is 1.48 and 1.52 and the first base angle BA1 is 90°, the lower limit elevation angle can be set to 40° or less, which is preferable.

Here, the reason why the lower limit elevation angle becomes the minimum value when the refractive index is approximately 1.41 (strictly √2) is that the critical angle becomes 45°. In the present embodiment, in the first prism 30, since full reflection is required on the first and third sides 30a and 30c and full transmission is required on the second side 30b, when the critical angle is 45°, full reflection can be achieved at 0° to 45° and full transmission can be achieved at 45° to 90°. That is, by equalizing the angle range of full reflection and full transmission, it is possible to prevent the tendency of only one of full reflection and full transmission from becoming extremely strong and to contribute to the minimization of the lower limit elevation angle.

In the present embodiment, the first prism 30 is not limited to the one in which the refractive index and the internal angle are set so that the lower limit elevation angle of the minimum lower limit elevation angle +10° is achieved. For example, in order to realize the above three types of optical paths OP1 to OP3, it should not be that the refractive index is more than 1.59 and the first base angle BA1 is more than 105° and less than 75° when the apex angle AA is 25°. That is, the first prism 30 may have a refractive index setting and an angle setting that realize the three types of optical paths OP1 to OP3 at the elevation angle of the altitude range that the sun can take in consideration of time and season in the installation area and direction. The first prism 30 is not limited to the case where the refractive index and the angle are set so that the three types of optical paths OP1 to OP3 are realized in the entire altitude range that the sun can take, and the refractive index and the angle may be set so that the three types of optical paths OP1 to OP3 are realized only in a part of the altitude range that the sun can cover (for example, the highest altitude in the installation area).

Although the lower limit elevation angle is illustrated in FIG. 3 when the apex angle AA is 25°, when the apex angle AA changes, the lower limit elevation angle value also changes.

FIG. 4 is a table illustrating a relationship between the angle of the first base angle BA1 and the lower limit elevation angle when the refractive index of the first prism 30 is changed, in a case where the apex angle AA of the first prism 30 is 30°.

As illustrated in FIG. 4, in a case where the material of the first prism 30 is a porous material or the like having a refractive index of 1.17, when the first base angle BA1 is 105°, 100°, 95°, 90°, 85°, 80°, and 75°, the lower limit elevation angle is 35°.

In addition, in a case where the material of the first prism 30 is a porous material or the like having a refractive index of 1.25, when the first base angle BA1 is 105°, 100°, 95°, 90°, 85°, 80°, and 75°, the lower limit elevation angle is 30°.

In a case where the material of the first prism 30 is a porous material or the like having a refractive index of 1.30, when the first base angle BA1 is 105° and 75°, the lower limit elevation angle is 33°, and when the first base angle BA1 is 100°, 95°, 90°, 85°, and 80°, the lower limit elevation angle is 27°.

In a case where the material of the first prism 30 is fluororubber having a refractive index of 1.33 and enclosed with water, when the first base angle BA1 is 105°, 100°, 95°, 90°, 85°, 80°, and 75° in this order, the lower limit elevation angle is 37°, 29°, 26°, 26°, 26°, 29°, and 37°.

In a case where the material of the first prism 30 is a fluororesin having a refractive index of 1.37 and enclosed with 20% saline, when the first base angle BA1 is 105°, 100°, 95°, 90°, 85°, 80°, and 75° in this order, the lower limit elevation angle is 41°, 33°, 26°, 24°, 26°, 33°, and 41°.

In a case where the material of the first prism 30 is acrylic having a refractive index of 1.41 and enclosed with silicone, when the first base angle BA1 is 105°, 100°, 95°, 90°, 85°, 80°, and 75° in this order, the lower limit elevation angle is 45°, 37°, 29°, 22°, 29°, 37°, and 45°.

In a case where the material of the first prism 30 is a borosilicate glass having a refractive index of 1.48, the first base angle BA1 is 105°, 100°, 95°, 90°, 85°, 80°, and 75° in this order, and the lower limit elevation angle is 53°, 44°, 35°, 27°, 35°, 44°, and 53°.

In a case where the material of the first prism 30 is a soda-lime glass having a refractive index of 1.52, the first base angle BA1 is 105°, 100°, 95°, 90°, 85°, 80°, and 75° in this order, and the lower limit elevation angle is 58°, 48°, 38°, 30°, 38°, 48°, and 58°.

In a case where the material of the first prism 30 is polycarbonate having a refractive index of 1.59, the first base angle BA1 is 105°, 100°, 95°, 90°, 85°, 80°, and 75° in this order, and the lower limit elevation angle is 70°, 56°, 45°, 35°, 45°, 56°, and 70°.

Thus, even when the apex angle AA is 30°, when the refractive index is approximately 1.41 and the first base angle BA1 is 90°, the lower limit elevation angle becomes the minimum value (22°). Therefore, when the apex angle AA is 30°, it is preferable to set the refractive index and the internal angle of the first prism 30 so that the lower limit elevation angle is 32° or less.

FIG. 5 is a table illustrating a relationship between the angle of the first base angle BA1 and the lower limit elevation angle when the refractive index of the first prism 30 is changed, in a case where the apex angle AA of the first prism 30 is 35°.

As illustrated in FIG. 5, in a case where the material of the first prism 30 is a porous material or the like having a refractive index of 1.17, when the first base angle BA1 is 105°, 100°, 95°, 90°, 85°, 80°, and 75°, the lower limit elevation angle is 29°.

In addition, in a case where the material of the first prism 30 is a porous material or the like having a refractive index of 1.25, when the first base angle BA1 is 105°, 100°, 95°, 90°, 85°, 80°, and 75°, the lower limit elevation angle is 23°.

In a case where the material of the first prism 30 is a porous material or the like having a refractive index of 1.30, when the first base angle BA1 is 105° and 75°, the lower limit elevation angle is 27°, and when the first base angle BA1 is 100°, 95°, 90°, 85°, and 80°, the lower limit elevation angle is 21°.

In a case where the material of the first prism 30 is fluororubber having a refractive index of 1.33 and enclosed with water, the first base angle BA1 is 105°, 100°, 95°, 90°, 85°, 80°, and 75° in this order, and the lower limit elevation angle is 29°, 22°, 19°, 19°, 19°, 22°, and 29°.

In a case where the material of the first prism 30 is a fluororesin having a refractive index of 1.37 and enclosed with 20% saline, the first base angle BA1 is 105°, 100°, 95°, 90°, 85°, 80°, and 75° in this order, and the lower limit elevation angle is 33°, 26°, 19°, 17°, 19°, 26°, and 33°.

In a case where the material of the first prism 30 is acrylic having a refractive index of 1.41 and enclosed with silicone, the first base angle BA1 is 105°, 100°, 95°, 90°, 85°, 80°, and 75° in this order, and the lower limit elevation angle is 37°, 29°, 22°, 14°, 22°, 29°, and 37°.

In a case here the material of the first prism 30 is a borosilicate glass having a refractive index of 1.48, the first base angle BA1 is 105°, 100°, 95°, 90°, 85°, 80°, and 75° in this order, and the lower limit elevation angle is 44°, 35°, 27°, 19°, 27°, 35°, and 44°.

In a case where the material of the first prism 30 is a soda-lime glass having a refractive index of 1.52, the first base angle BA1 is 105°, 100°, 95°, 90°, 85°, 80°, and 75° in this order, and the lower limit elevation angle is 48°, 38°, 30°, 22°, 30°, 38°, and 48°.

In a case where the material of the first prism 30 is polycarbonate having a refractive index of 1.59, the first base angle BA1 is 105°, 100°, 95°, 90°, 85°, 80°, and 75° in this order, and the lower limit elevation angle is 56°, 45°, 35°, 27°, 35°, 45°, and 56°.

Thus, even when the apex angle AA is 35°, when the refractive index is approximately 1.41 and the first base angle BA1 is 90°, the lower limit elevation angle becomes the minimum value (14°). Therefore, when the apex angle AA is 30°, it is preferable to set the refractive index and the internal angle of the first prism 30 so that the lower limit elevation angle is 24° or less.

FIG. 6 is a table illustrating the relationship with the lower limit elevation angle when the apex angle AA is changed, in, a case where the refractive index of the first prism 30 is approximately 1.41 and the first base angle BA1 is 90°.

As illustrated in FIG. 6, in the case where the refractive index of the first prism 30 is approximately 1.41 and the first base angle BA1 is 90°, the lower limit elevation angle is 46° when the apex angle AA is 15°, and the lower limit elevation angle is 37° when the apex angle AA is 20°. In addition, the lower limit elevation angle when the apex angle AA is 25°, 30°, and 35° is 30°, 22°, and 14° in this order, as described with reference to FIGS. 3 to 5. In addition, the lower limit elevation angle when the apex angle AA is 40° and 45° is 8° and 1°.

Here, it can be said that the smaller the lower limit elevation angle, the wider the angle range for realizing the first to third optical paths OP1 to OP3, which is preferable for energy acquisition. However, as the apex angle AA approaches 45° in order to reduce the lower limit elevation angle, there is a tendency that the height when the first side 30a is the bottom becomes higher and the thickness of the solar energy utilization window 1 increases. In addition, it is desirable for the window that the apex angle AA is small, the vertical intervals between the energy collection portions 40 are wide, and the scattered light and the outside scene that are almost horizontal are transmitted indoors without being fully reflected. Therefore, it is preferable that the apex angle AA is adjusted appropriately according to the area where the solar energy utilization window 1 is used.

For example, in Japan, the elevation angle (incident angle to the elevation) is 32° when the southing altitudes of the sun are the lowest, such as the winter solstice. Therefore, in Japan, in a case where the solar energy utilization window 1 is used on the south side, by setting the apex angle AA to 20° or 25°, it is possible to improve the utilization efficiency of solar energy, contribute to making the solar energy utilization window 1 thinner, and make it possible to achieve both lighting by indirect light and viewability. In addition, if the utilization efficiency of solar energy is increased at sunrise and sunset on the east surface or the west surface, the apex angle AA may be increased. Therefore it is preferable that the solar energy utilization window 1 for the south surface (for the north surface in the southern hemisphere) has a smaller apex angle AA than the solar energy utilization window 1 for the east surface and the west surface.

In addition, in Japan or similar latitude areas, considering the south surface, east surface, and west surface, the apex angle AA is preferably 20° or more and 35° or less.

FIG. 7 is a table illustrating the relationship between the refractive indices of the prism wall 31 and the liquid that is the internal member 32 of the first prism 30 illustrated in FIG. 2 and the lower limit elevation angle. In the example illustrated in FIG. 7, the apex angle AA of the first prism 30 is 30° and the first base angle BA1 is 90°.

In a case where the refractive indices of the prism wall 31 and the internal member 32 of the first prism 30 are different, the refractive index of the prism wall 31 does not affect the overall refractive index of the first prism 30. The details will be described below.

First, in a case where the refractive index of the internal member 32 is 1.33, when the refractive index of the prism wall 31 is 1.33, 1.37, 1.41, 1.48, 1.52, and 1.59, the lower limit elevation angle is 26°. In addition, in a case where the refractive index of the internal member 32 is 1.37, when the refractive index of the prism wall 31 is 1.33, 1.37, 1.41, 1.48, 1.52, and 1.59, the lower limit elevation angle is 24°. Similarly, regardless of the refractive index of the prism wall 31, when the refractive index of the internal member 32 is 1.41, the lower limit elevation angle is 22°, when the refractive index of the internal member 32 is 1.48, the lower limit elevation angle is 27°, when the refractive index of the internal member 32 is 1.52, the lower limit elevation angle is 30°, and when the refractive index of the internal member 32 is 1.59, the lower limit elevation angle is 35°.

From the above, it has been found that the refractive index of the first prism 30 depends on the refractive index of the internal member 32 and is not affected by the refractive index of the prism wall 31.

Next, the operation of the solar energy utilization window 1 (utilization efficiency of solar energy) according to the present embodiment will be described with reference to FIG. 2.

First, in the solar energy utilization window 1 according to the present embodiment, the three types of optical paths OP1 to OP3 are realized by setting the refractive index and the internal angle of the first prism 30. Therefore, the sunlight that has passed through the outer glass 10a and entered into the first prism 30 from the first side 30a directly reaches the second side 30b and is emitted from the second side 30b to the outside of the first prism 30 to form the first optical path OP1. Furthermore, the sunlight is fully reflected at the third side 30c, reaches the second side 30b, and is emitted from the second side 30b to the outside of the first prism 30 to form the second optical path OP2. In addition, the sunlight is fully reflected at the third side 30c and the first side 30a in this order, and then reaches the second side 30b and is emitted from the second side 30b to the outside of the first prism 30 to form the third optical path OP3. Furthermore in an environment in which the above-described three types of optical paths OP1 to OP3 are realized, the sunlight is emitted from the second side 30b after undergoing full reflection three times or more to form an optical path.

The sunlight emitted from the second side 30b enters the energy collection portion 40 and is utilized as energy. Here, the energy collection portion 40 is disposed with the gap C1 without contacting the first prism 30. Therefore, the heat of the energy collection portion 40 is less likely to transfer to the first prism 30, and the solar heat can be utilized more efficiently.

In this way, according to the solar energy utilization window 1 according to the present embodiment, the energy collection portion 40 is installed with the predetermined gap C1 interposed between the energy collection portion 40 and the second side 30b. Therefore, the presence of the predetermined gap C1 makes it difficult for the solar heat in the energy collection portion 40 to transfer to the first prism 30. In addition, in the first prism 30, since the refractive index and each internal angle of the triangle are set so that there are the three types of optical paths OP1 to OP3, the sunlight that has entered into the first prism 30 from the first side 30a goes out of the first prism 30 from the second side 30b directly or through the full reflection of the third side 30c and the first side 30a. That is, when the sunlight incident on the first side 30a of the first prism 30 is emitted from the second side 30b, the sunlight can be collected also in the energy collection portion 40 disposed with the predetermined gap C1. Therefore, it is possible to utilize solar energy more efficiently by collecting the sunlight in the energy collection portion 40 while suppressing the heat transfer.

In addition, since the first prism 30 includes the transparent prism wall 31 forming an outer wall of the first prism 30 and the transparent inner member 32 enclosed inside the prism wall 31, the refractive index of the first prism 30 depends on the internal member 32, is less affected by the prism wall 31, and the first prism 30 having a desired refractive index can be easily formed.

In addition, in the first prism 30, the lower limit elevation angle of the sunlight when the three types of optical paths OP1 to OP3 are realized for the sunlight entering from the first side 30a is the minimum value when the refractive index is approximately 1.41 and the angle formed by the second side 30b and the third side 30c is 90°. Here, the inventor of the present invention has found that the lower limit elevation angle has the minimum value when the first prism 30 is approximately 1.41 and the angle is 90°. Therefore, by setting the refractive index and the angle so that the lower limit elevation angle is +10° or less than this minimum value, it is possible to provide the solar energy utilization window 1 in which the lower limit elevation angle is brought close to the minimum value and sunlight can be collected in the energy collection portion 40 in a wider angle range (sun elevation angle).

In addition, since the second prism 50, which has the same shape as the first prism 30 and is disposed in a direction that is point-symmetrical to the first prism 30 is further provided, the second prism 50 can provide an image restoration effect. Furthermore, the energy collection portion 40 is provided between the second side 30b of the first prism 30 and the fifth side 50b of the second prism 50 and separated from both sides. Therefore, the heat of the energy collection portion 40 is less likely to transfer to the second prism 50, and the solar energy can be utilized more efficiently.

Next, a second embodiment of the present invention will be described. A solar energy utilization window according to the second embodiment is the same as that of the first embodiment, but the configuration is partially different. In the following description, elements that are the same as or similarly to those in the first embodiment will be assigned the same reference numerals and description thereof will be omitted.

Figure 8:
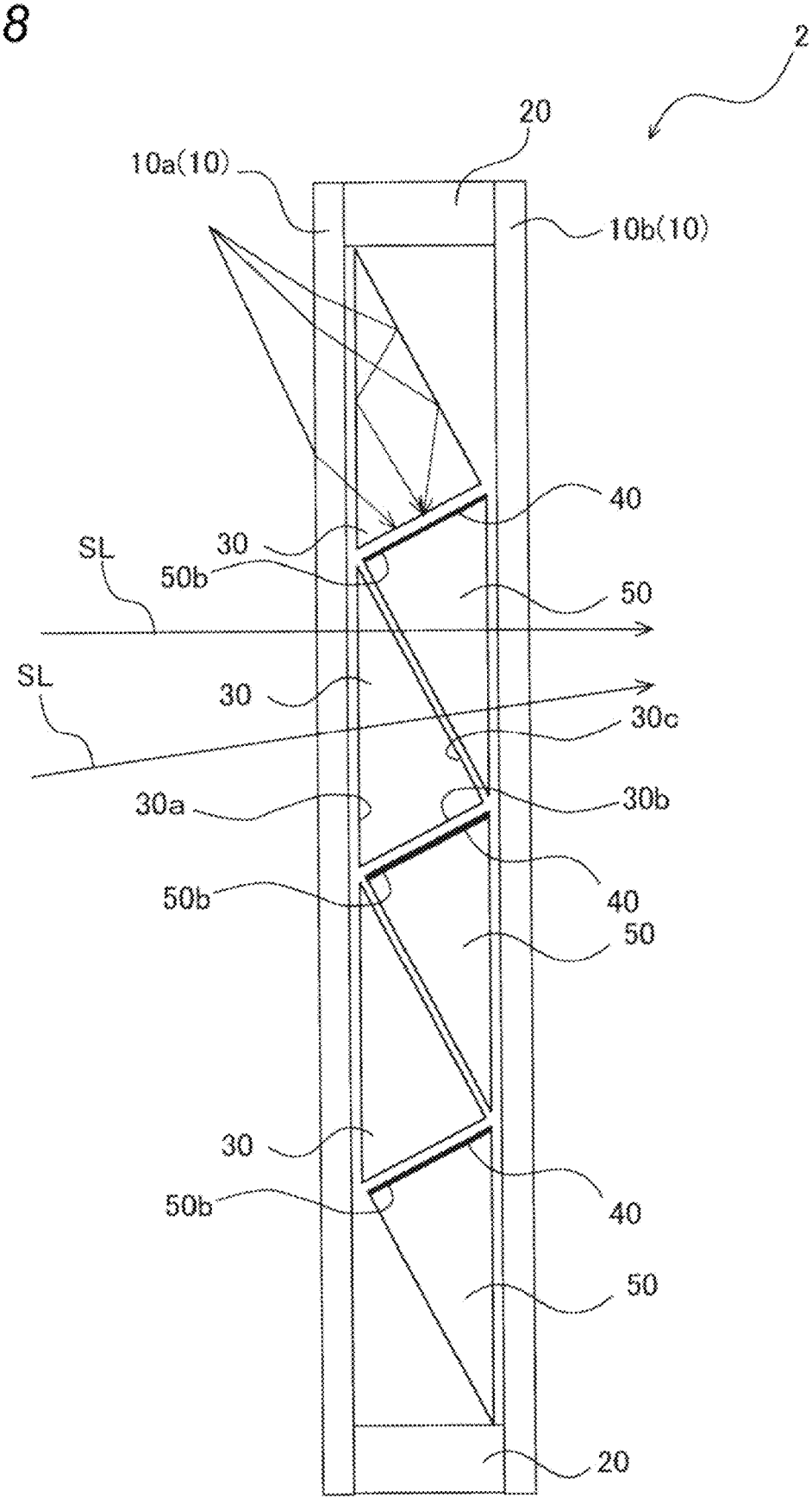
FIG. 8 is a cross-sectional view illustrating a solar energy utilization window according to a second embodiment.

FIG. 8 is a cross-sectional view illustrating the solar energy utilization window according to the second embodiment. As illustrated in FIG. 8, in a solar energy utilization window 2 according to the second embodiment, the energy collection portion 40 has the same configuration as the second prism 50 according to the first embodiment. That is, the energy collection portion 40 is substantially transparent (transparent except for a selective absorption unit described later), has the same shape as the first prism 30 in a cross-sectional view, and is disposed in a direction that is point-symmetrical to the first prism 30. However, the portion corresponding to the fifth side 50b of the energy collection portion 40 is the selective absorption unit having a high absorptance in the solar wavelength region (0.3 to 2.5 μm) and low emissivity in the infrared wavelength region (3.0 to 20 μm). A solar cell may be provided instead of the selective absorption unit.

Such an energy collection portion 40 is disposed in pairs with the first prism 30. That is, the energy collection portion 40 is disposed such that a portion corresponding to the fifth side 50b faces the second side 30b of the first prism 30. In addition since the energy collection portion 40, except for the selective absorption unit 41, also functions as a transparent prism that refracts light, similarly to the second prism 50 illustrated in the first embodiment, the so-called image restoration effect is exhibited.

In the second embodiment, the energy collection portion 40 can have various forms, similarly to the first prism 30 described in the first embodiment, and can be configured by a prism wall and an internal member made of a liquid (heat medium), similarly to the first prism 30, for example. In particular, in this case, for example, by providing a regenerator of an absorption refrigerator and a pump and a pipe for circulating the heat medium in the energy collection portion 40, the heated heat medium can be utilized by other devices.

In addition the energy collection portion 40 may be formed of a solid member having a hygroscopic property. In this case, moisture can be released from the energy collection portion 40 heated by the first prism 30, and a humidifying effect can be provided indoors. In the case of this configuration, it is preferable that the front and back of the two plate members 10 are configured to be reversible and the front and back of the two plate members 10 is reversed at night so that moisture can be accumulated in the energy collection portion 40. In addition, the inner glass 10b is made of a material that is permeable to water vapor.

Furthermore, the first prism 30 may be configured by the prism wall 31 and the internal member 32 made of a hygroscopic liquid, and the energy collection portion 40 may be similarly configured by a prism wall and an internal member made of a hygroscopic liquid. In this configuration, by attaching a pipe and a pump that allow the hygroscopic liquid to circulate in the first prism 30 and the energy collection portion 40, for example, the operation of releasing moisture from the energy collection portion 40 and absorbing the moisture by the first prism 30 can be continuously performed. In this case, for example, the prism wall of the energy collection portion 40, the prism wall 31 of the first prism 30, the outer glass 10a, and the inner glass 10b may be made of a material that is permeable to water vapor, and a film that is impermeable to water vapor may be provided between the first prism 30 and the energy collection portion 40. In addition, the prism wall 31 of the first prism 30 and the outer glass 10a may be made of a material that is impermeable to water vapor. In this case, for example, a pipe or a pump for sending the outside air into the first prism 30 and again discharging the air bubbles that have been taken out of water in the first prism 30 and dried to the outside air is provided. Furthermore, the prism wall of the energy collection portion 40 and the inner glass 10b may be made of a material that is impermeable to water vapor. In this case, it is preferable to provide, for example, a pipe or a pump that sends indoor air into the energy collection portion 40 and returns the air bubbles that have become wet due to water acquisition in the energy collection portion 40 indoors again.

In this way, the solar energy utilization window 2 according to the second embodiment can utilize solar energy more efficiently, as in the first embodiment. In addition, in a case where the first prism 30 is configured by the transparent prism wall 31 and the transparent internal member 32, it is possible to easily form the first prism 30 having a desired refractive index. Furthermore, by setting the refractive index and the angle so that the lower limit elevation angle is +10° or less than the minimum value, it is possible to provide the solar energy utilization window 2 in which the lower limit elevation angle is brought close to the minimum value and sunlight can be collected in the energy collection portion 40 in a wider angle range (sun elevation angle).

Furthermore, according to the second embodiment, since the energy collection portion 40 has the same shape as the first prism 30 in a cross-sectional view and, is disposed in a direction that is point-symmetrical to the first prism 30, and a part (the selective absorption unit 41) is non-transparent and the rest is transparent, the energy collection portion 40 can be made to have the function of an image restoration prism by utilizing the transparent portion.

In particular, in a case where the energy collection portion 40 is configured by a prism wall and a liquid (heat medium) internal member similarly to the first prism 30, for example, the heat medium can also be transferred to a regenerator or the like of an absorption refrigerator. In addition, by forming the energy collection portion 40 with a hygroscopic member, a humidifying effect can be provided indoors. Furthermore, when the first prism 30 is configured with the prism wall 31 and the internal member 32 made of a hygroscopic liquid, the energy collection portion 40 has the same configuration, and the hygroscopic liquid is circulated in the first prism 30 and the energy collection portion 40, for example, the operation of releasing the moisture from the energy collection portion 40 and absorbing the moisture by the first prism 30 can be continuously performed.

Next, a third embodiment of the present invention will be described. A solar energy utilization window according to the third embodiment is the same as that of the first embodiment, but the configuration is partially different. In the following description, elements that are the same as or similarly to those in the first embodiment will be assigned the same reference numerals and description thereof will be omitted.

Figure 9:
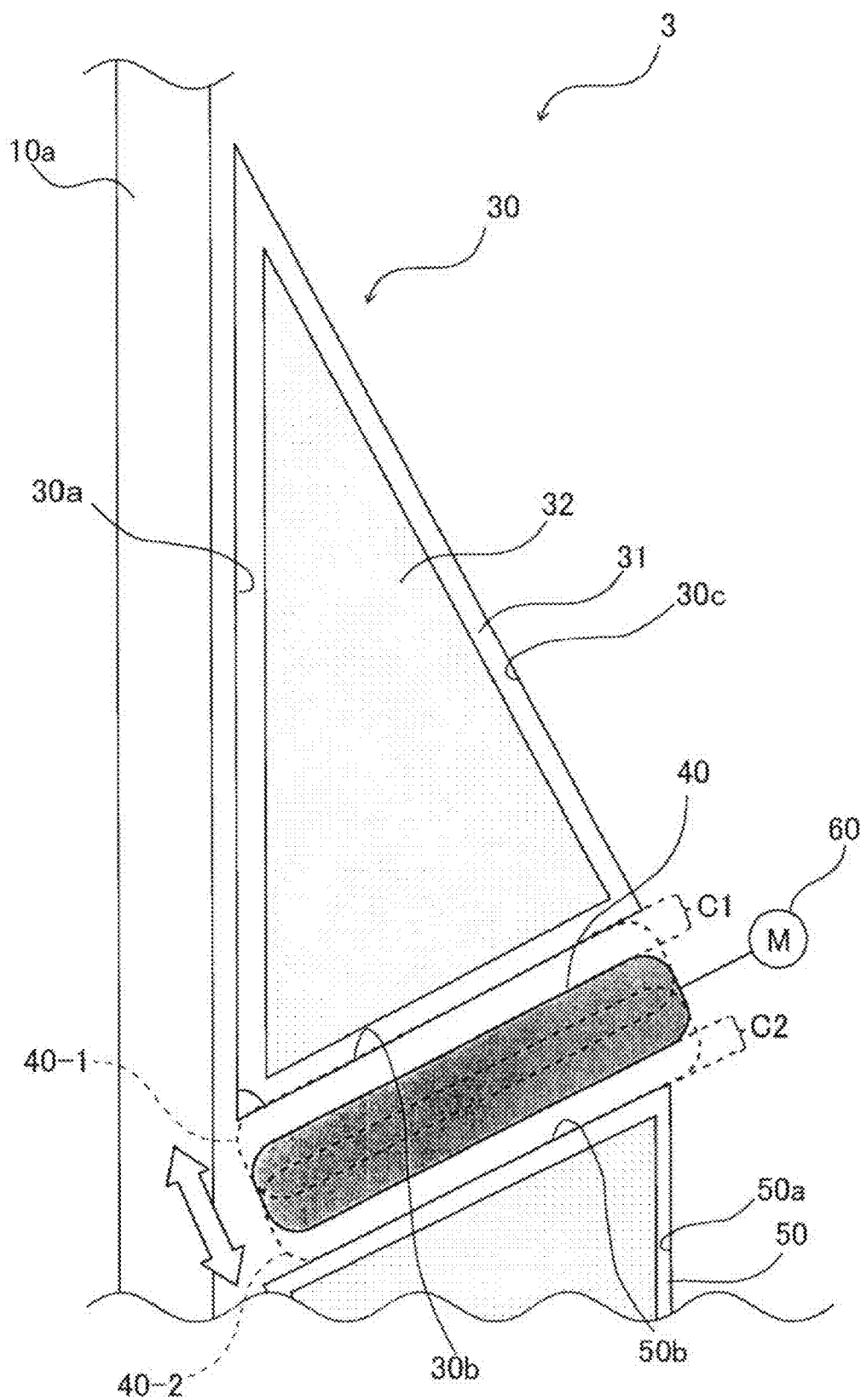
FIG. 9 is a partially enlarged cross-sectional view illustrating a solar energy utilization window according to a third embodiment.

FIG. 9 is a partially enlarged cross-sectional view illustrating the solar energy utilization window according to the third embodiment. As illustrated in FIG. 9, in a solar energy utilization window 3 according to the third embodiment, each of the plurality of energy collection portions 40 is disposed with the gap C1 with respect to the first prism 30 and the gap C2 with respect to the second prism 50. Based on this state, the solar energy utilization window 3 according to the third embodiment includes a moving mechanism 60 that moves the plurality of energy collection portions 40 between the second side 30b and the fifth side 50b.

The moving mechanism 60 is not particularly limited as long as the mechanism can move the energy collection portion 40 between the second side 30b and the fifth side 50b, but includes, for example, a motor serving as a power source for moving the energy collection portion 40, and a moving rail of the energy collection portion 40.

In addition, in the third embodiment, the roving mechanism 60 is capable of moving the energy collection portion 40 to a position where the energy collection portion contacts the second side 30b and the fifth side 50b. Specifically, the moving mechanism 60 can move the energy collection portion 40 to the position indicated by a reference numeral 40-1 and bring the energy collection portion 40 into contact with the second side 30b of the first prism 30. Similarly, the moving mechanism 60 can move the energy collection portion 40 to the position indicated by a reference numeral 40-2 and bring the energy collection portion 40 into contact with the fifth side 50b of the second prism 50.

As a result, the solar energy utilization window 3 according to the third embodiment can heat either one of the first prism 30 and the second prism 50.

Therefore, the solar energy utilization window 3 according to the third embodiment can operate as follows. For example, in a case where the second prism 50 has a hygroscopic member or a liquid, when the energy collection portion 40 is brought into contact with the fifth side 50b of the second prism 50 by the moving mechanism 60, the hygroscopic member or the like can be heated to release moisture. On the other hand, in a case where the first prism 30 and the second prism 50 have a hygroscopic liquid, which can be circulated therebetween, when the energy collection portion 40 is brought into contact with the second side 30b of the first prism 30, the first prism 30 releases the moisture and the hygroscopic liquid from which the moisture has been released is supplied to the second prism 50 so that the second prism 50 absorbs the moisture.

In this way, according to the solar energy utilization window 3 of the third embodiment, the solar energy can be utilized more (further) efficiently, as in the first embodiment. In addition, in a case where the first prism 30 is configured by the transparent prism wall 31 and the transparent internal member 32, it is possible to easily form the first prism 30 having a desired refractive index. Furthermore, by setting the refractive index and the angle so that the lower limit elevation angle is +10° or less than the minimum value, it is possible to provide the solar energy utilization window 3 in which the lower limit elevation angle is brought close to the minimum value and sunlight can be collected in the energy collection portion 40 in a wider angle range (sun elevation angle).

Furthermore, according to the third embodiment, since the moving mechanism 60 that allows the energy collection portion 40 to be separated from the second side 30*b* and the fifth side 50*b* is further provided, when one of the prisms 30 and 50 is desired to be heated, it is possible to bring the energy collection portion 40 into contact with the prisms 30 and 50, and it is possible to further diversify the functions.

Although the present invention has been described above based on the embodiments, the present invention is not limited to the above embodiments, and modifications may be made without departing from the spirit of the present invention, and other techniques may be combined as appropriate within the possible range. Further, known or well-known techniques may be combined to the extent possible.

Figure 10:
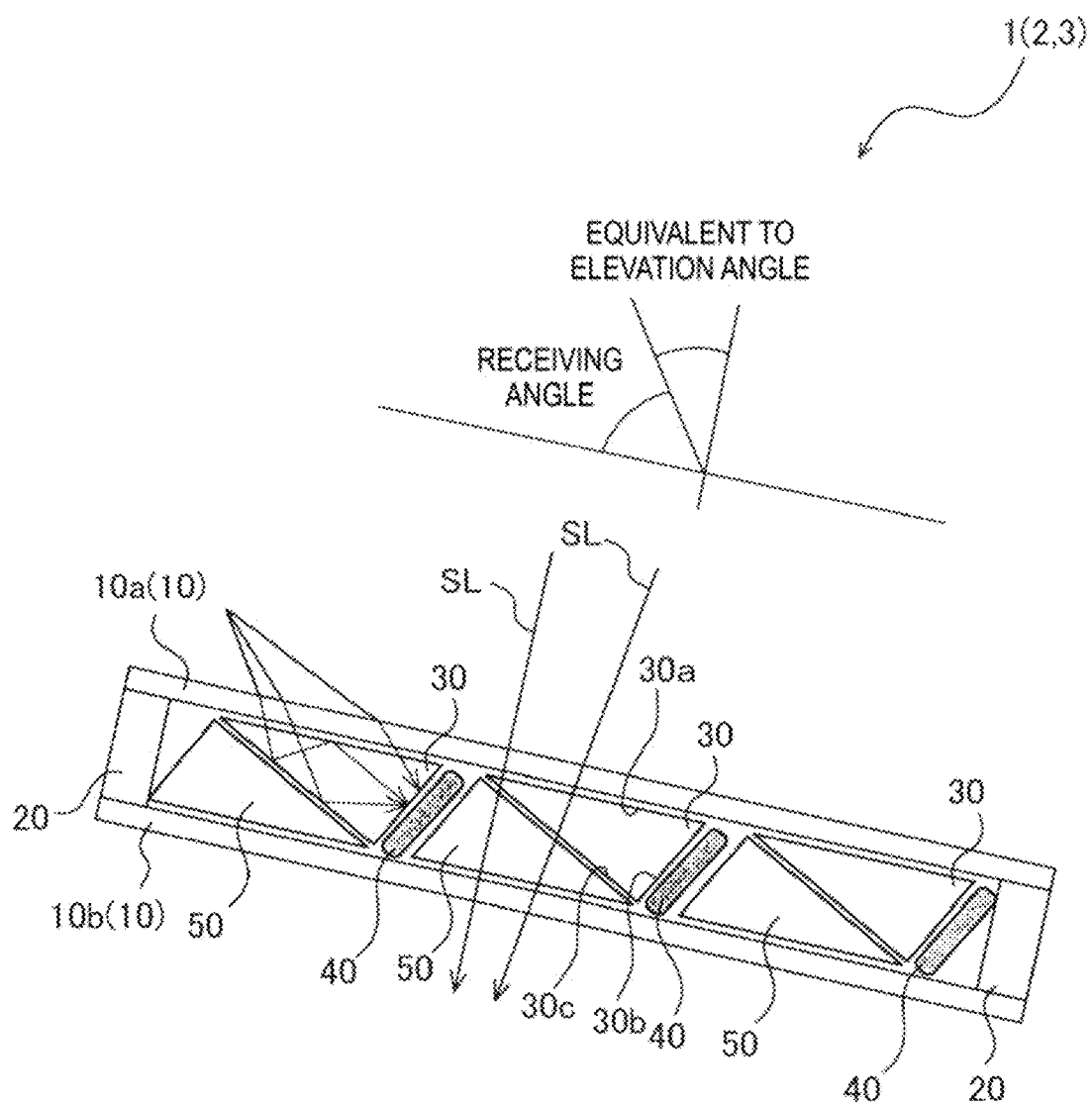
FIG. 10 is a cross-sectional view illustrating an example in which the solar energy utilization window is used on an inclined surface.

For example, in the present embodiment, an example in which the solar energy utilization windows 1 to 3 are used in an upright state has been described, but the solar energy utilization window 1 may be used not only in an upright state but also on an inclined surface (for example, a roof surface), FIG. 10 is a cross-sectional view illustrating an example in which the solar energy utilization windows 1 to 3 are used on an inclined surface. As illustrated in FIG. 10, the solar energy utilization windows 1 to 3 may be used, for example, in an inclined surface inclining to the north side in Japan. This is because even in such a case, the three types of optical paths OP1 to OP3 can be realized from the relationship with the lower limit elevation angle during the elevation.

In addition, although the solar energy utilization windows 1 to 3 have the two-layer structure of the outer glass 10*a* and the inner glass 10*b* in the above embodiment, the solar energy utilization windows 1 to 3 may be provided with a plate member of a third layer or more.

Furthermore, in the solar energy utilization window 3 according to the third embodiment, it is assumed that the plurality of energy collection portions 40 are integrally moved by the moving mechanism 60, but the present invention is not limited thereto, and only some of the energy collection portions 40 may be moved in a different direction from the other energy collection portions 40. That is, each energy collection portion 40 may be moved to a different position.

Although various embodiments have been described above with reference to the drawings, it goes without saying that the present invention is not limited to such examples. It is obvious to those skilled in the art that various changes or modifications can be conceived within the scope of the claims, and it is understood that those changes and modifications naturally belong to the technical scope of the present invention. Further, the constituent elements in the above-described embodiments may be arbitrarily combined without departing from the spirit of the invention.

What is claimed is:

1. A solar energy utilization device comprising:
two plate members that include a first transparent plate member and a second transparent plate member disposed substantially parallel to the first transparent plate member;
a transparent first triangular prism that is disposed between the two plate members and is composed of a first side along the second transparent plate member in a cross-sectional view, and second and third sides; and
an energy collection portion that is installed with a predetermined gap interposed between the energy collection portion and an entirety of the second side and collects solar energy,
wherein the transparent first triangular prism comprises a refractive index and is arranged such that internal angles of the transparent first triangular prism form three types of optical paths of sunlight that has passed through the second transparent plate member and entered into the transparent first triangular prism from the first side, the three types of optical paths including an optical path along which the sunlight that directly reaches the second side and goes out of the transparent first triangular prism from the second side, an optical path along which the sunlight that is fully reflected at the third side, reaches the second side, and goes out of the transparent first triangular prism from the second side, and an optical path along which the sunlight is fully reflected at the third side and the first side in order, and then reaches the second side and goes out of the transparent first triangular prism from the second side,
wherein the solar energy utilization device further comprises a transparent second triangular prism that is the same shape as the transparent first triangular prism in cross-sectional view, is composed of a fourth side and fifth and sixth sides, and is disposed such that the transparent second triangular prism is in an inverted mirrored image of the transparent first triangular prism in a direction in which the energy collection portion is therebetween the transparent first triangular prism and the second transparent triangular prism,
wherein a vacuum layer is formed between the second side of the transparent first triangular prism and the fifth side of the transparent second triangular prism,
wherein the energy collection portion is provided in the vacuum layer, and
wherein the energy collection portion is provided between the second side and the fifth side and is separated from both the second side and the fifth side by a first gap, of the vacuum layer, between the second side and the energy collection portion and a second gap, of the vacuum layer, between the fifth side and the energy collection portion.

2. The solar energy utilization device according to claim 1, wherein
the transparent first triangular prism includes a transparent prism wall, of at least one of the first side, the second side, and the third side, forming an outer wall of the transparent first triangular prism, and a transparent inner member enclosed inside the prism wall.

3. The solar energy utilization device according to claim 1, wherein
the refractive index of the transparent first triangular prism is approximately 1.41 and an angle formed by the second side and the third side is 90°.

4. The solar energy utilization device according to claim 1, wherein
the energy collection portion has a substantially same shape as the transparent first triangular prism in a cross-sectional view, and is disposed adjacent to the second side of the transparent first triangular prism, and a part of the energy collection portion is non-transparent and the rest is transparent.

5. The solar energy utilization device according to claim 1, further comprising:
a moving mechanism that moves the energy collection portion between the second side and the fifth side and allows the energy collection portion to be separated from the second side and the fifth side.

6. The solar energy utilization device according to claim 1,
wherein the second side is a closest one of the first side, the second side, and the third side to the energy collection portion and to the fifth side,
wherein the fifth side is a closest one of the fourth side, the fifth side, and the sixth side to the energy collection portion.

7. A solar energy utilization device comprising:
two plate members that include a first transparent plate member and a second transparent plate member disposed substantially parallel to the first transparent plate member;
a transparent first triangular prism that is disposed between the two plate members and is composed of a first side along the second transparent plate member in a cross-sectional view, and second and third sides; and
an energy collection portion that is installed with a predetermined gap interposed between the energy collection portion and an entirety of the second side and collects solar energy,
wherein the transparent first triangular prism comprises a refractive index and is arranged such that internal angles of the transparent first triangular prism form three types of optical paths of sunlight that has passed through the second transparent plate member and entered into the transparent first triangular prism from the first side, the three types of optical paths including an optical path along which the sunlight that directly reaches the second side and goes out of the transparent first triangular prism from the second side, an optical path along which the sunlight that is fully reflected at the third side, reaches the second side, and goes out of the transparent first triangular prism from the second side, and an optical path along which the sunlight is fully reflected at the third side and the first side in order, and then reaches the second side and goes out of the transparent first triangular prism from the second side,
wherein the solar energy utilization device further comprises a transparent second triangular prism that is the same shape as the transparent first triangular prism in cross-sectional view, is composed of a fourth side and fifth and sixth sides, and is disposed such that the transparent second triangular prism is inverted mirrored image of the transparent first triangular prism in a direction in which the energy collection portion is therebetween the transparent first triangular prism and the second transparent triangular prism,
wherein the energy collection portion is provided between the second side and the fifth side and is separated from both the second side and the fifth side,
wherein a vacuum layer is formed between the second side of the transparent first triangular prism and the fifth side of the transparent second triangular prism, and
wherein the energy collection portion is provided in the vacuum layer, and
wherein the solar energy utilization device further comprises a moving mechanism that moves the energy collection portion between the second side and the fifth side and allows the energy collection portion to be separated from the second side and the fifth side.

\* \* \* \* \*